United States Patent [19]

Ratuio

[11] Patent Number: 4,621,971

[45] Date of Patent: Nov. 11, 1986

[54] MEANS FOR ROTATING TREE TRUNKS

[76] Inventor: Kauko Ratuio, 52700 Mäntyharju, Kolmihaarantie, Finland

[21] Appl. No.: 726,234

[22] Filed: Apr. 23, 1985

[30] Foreign Application Priority Data

May 3, 1984 [FI] Finland ................................ 841768

[51] Int. Cl.$^4$ ............................................ B65G 47/24

[52] U.S. Cl. ................................ 414/431; 144/246 C; 144/246 F; 198/379; 198/625; 414/757

[58] Field of Search ............... 414/431, 432, 433, 757; 198/379, 413, 625, 663; 144/242 C, 246

[56] References Cited

U.S. PATENT DOCUMENTS

| | | | |
|---|---|---|---|
| 3,854,614 | 12/1974 | Albrecht | 414/432 |
| 3,945,413 | 3/1976 | Eriksson | 144/246 R |
| 3,981,393 | 9/1976 | Landers | 414/433 X |
| 4,365,704 | 12/1982 | Stenvall | 414/757 X |

FOREIGN PATENT DOCUMENTS

| | | | |
|---|---|---|---|
| 712248 | 1/1980 | U.S.S.R. | 144/246 R |
| 814827 | 3/1981 | U.S.S.R. | 414/757 |

*Primary Examiner*—Leslie J. Paperner
*Attorney, Agent, or Firm*—Browdy and Neimark

[57] ABSTRACT

A means for rotating tree trunks or equivalent into correct position regarding their curvature, prior to their feeding into a machine processing round timber. The means is primarily intended to be used as an ancillary in a timber feeding means which feeds the tree trunks into a processing machine, because branch stubs which have remained on the tree trunk may impede the turning of the tree in the feeding means. The means of the invention has been carried out in such manner that the means comprises one or several rotator pairs, each such pair being composed of two rotators provided with a helix and disposed in the tree trunk feeding means, and which in their operating position are elastically urged against the tree trunk and which are arranged to rotate with reference to each other so that the tree trunk therebetween rotates, forced by the helices, in the desired direction.

2 Claims, 2 Drawing Figures

MEANS FOR ROTATING TREE TRUNKS

Figure 1:
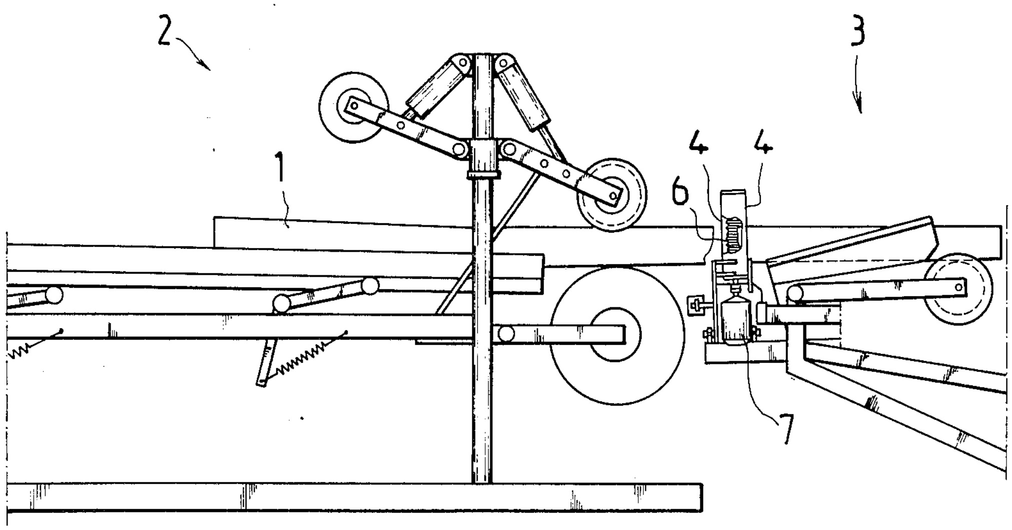

The present invention concerns a means for rotating tree trunks or equivalent into correct position regarding their curvature, prior to feeding them into a machine processing round timber.

When a tree is fed into certain types of machines processing round timber, for instance into hewing machines or saws, the tree must, prior to feeding to the processing blades, be rotated into correct position with regard to its curvature, for instance with its back downwards.

In the Finnish patent application No. 832798 is disclosed a tree feeding means which carries out the above-mentioned functions in a handy way. In practice, however, there may remain branch stubs on the trunks, which prevent the tree from turning round properly when it is being processed with the above means.

Nowadays, to this purpose are used for instance chains placed under the tree trunk, by moving which the tree trunk can be turned in the desired direction. However, they have the drawback that the tree trunk cannot be moved axially at the same time, whereby the feeding of the tree is slowed down. At present also rollers provided with gripping studs and placed on both sides of the tree trunk are used which are inclined in the feed direction of the tree trunk. Hereby, it is achieved that the tree trunk is forced to turn, as it is proceeding, in the desired direction. The drawback of this means is, however, that the tree trunk cannot be rotated while stationary.

The object of the present invention is to provide a means which, combined e.g. with the means disclosed in the Finnish patent application No. 832798, constitutes a tree feeding means which is more reliable in operation than before and by which the tree trunk can be rotated into desired position, no matter whether the tree trunk is in motion or stationary. The rotating means of the invention is therefore characterized in that the means comprises one or several rotator pairs, each such pair being composed of two rotators disposed in the tree trunk feeding means and provided with helices, said rotators in their operating position being elastically urged against the tree trunk and being arranged to rotate in such manner with reference to each other that the tree trunk therebetween will rotate, forced by the helices, in the desired direction. With the aid of the means, the tree trunk is positively rotated into the desired position. The rotating means of the invention may be used either as an ancillary to another rotating means, to make sure that the desired position is achieved, or as sole rotating means in a tree trunk feeding means.

An advantageous embodiment of the invention is characterized in that the number of rotator pairs is one and each of its rotators is provided with an electromotor of its own. This enables the rotators on opposite sides of the tree trunk to be rotated in different directions with reference to each other, which is indispensable if their helices are same-handed.

Another advantageous embodiment of the invention is characterized in that the rotators are disposed obliquely in the tree trunk feeding direction so that the helix crests parallel the centre-line of the tree trunk. This is highly important because it allows propagation of the tree trunk while it is being rotated and therefore the rotating does not detract from the feed rate.

One more advantageous embodiment of the invention is characterized in that the rotators are pivotally carried at their lower parts so that they can be turned aside if need be. When this rotating means according to the present invention is used only as an ancillary or to ensure the turning, the normal position of the rotators is that in which they are apart from the tree trunks. The rotators are only turned against the tree when it is observed that the tree has not turned as desired in the preceding means.

Still one advantageous embodiment of the invention is characterized in that the elastic force with which the rotators act on the tree trunk is produced by means of pneumatic cylinders connecting the rotators. The force should be relatively light and elastic so that the tree trunks can move forward even during the rotation.

The invention is described in the following in detail with the aid of an example, referring to the drawings attached, wherein FIG. 1 presents an advantageous embodiment of the invention, in which it is disposed between a tree feeding means and a machine processing the tree.

Figure 2:
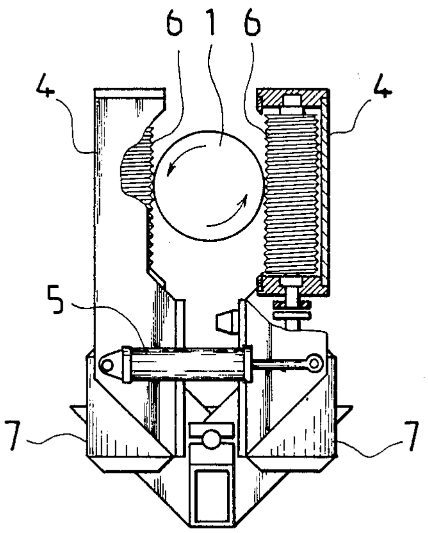

FIG. 2 presents the rotating means of the invention, in end view and partly sectioned.

In FIG. 1 is presented an important embodiment of the invention in which it is incorporated as a component in a tree feeding means 2. In the tree feeding means 2, the tree trunk 1 is centred in the lateral and height directions and turned into correct position regarding its curvature, for instance with its back side downwards, prior to being fed into the machine 3 processing timber. Between these means 2 and 3 has been mounted a rotating means according to the invention, because it has been found in practice that the tree is not always turned in the desired way by the tree feeding means alone. The invention is used as an ancillary by which the feeding of the tree 1 is interfered with if need be.

For operating the rotating means, one operator is needed, who watches the feeding of tree trunks 1 into the processing machine 3. When observing a tree trunk which has not rotated in the desired way regarding its curvature, the operator turns with the aid of a control handle the pivoted rotators 4 of the rotating means against the tree trunk into the position shown in FIG. 2. The helical parts 6 of the rotators 4 engage elastically with the sides of the tree trunk 1 with the aid of the pneumatic cylinder 5. Let us assume that the helices of the rotators are different-handed. The tree trunk can then be caused to rotate by setting with the aid of the electromotors 7 the helical parts 6 of the rotators into rotation in the same direction. In spite of the simultaneous rotation, the tree trunk continues its movement all the time towards the processing means 3. This has been made possible by mounting the rotators 4 with a slight inclination in the tree feeding direction, whereby the crests of the helices 6 have become parallel to the tree trunk 1. When the tree trunk has turned in the desired way, the rotators 4 are stopped and turned off the tree trunk.

Control of the rotators may take place with the aid of a control handle pivotally carried at its lower end, pulling on the handle positioning the rotators in contact with the tree trunk, and vice versa. When the handle is pulled and at the same time inclined to the right, the rotating movement of the helices is switched on so as to rotate the tree to the right. Similarly, inclining the handle to the left makes the tree rotate to the left. The handle may be provided with a button on depressing which the feeding means or conveyor comes to a standstill.

It is obvious to a person skilled in the art that the invention is not confined to the embodiment example mentioned above and that it may be modified within the scope of the claims following below. For instance, the motors driving the rotators are not necessarily electrically operated: they may be any motors, for instance hydraulically operated ones. Likewise, there may be more than one rotator pair.

I claim:

1. For use with conveyor apparatus including drive means for feeding a log to a processing station in a direction substantially parallel with the longitudinal axis of the log, a device for imparting rotational motion to a log about its longitudinal axis independently of the feeding motion of the log, comprising:

at least one pair of cylindrical rotators supported on opposite sides of said log for selective engagement with said log, said rotators having a longitudinal axis and external surfaces having helical upstanding portions, the longitudinal axes of said rotators being angularly disposed relative to said log longitudinal axis so that the upstanding portions on said rotator external surfaces do not impede the rate of feed of said log when said conveyor is operating, and drive means, independent of said conveyor apparatus drive means, for driving said rotators in rotation about their longitudinal axes, whereby rotation of said log about its longitudinal axis is effected.

2. For use with conveyor apparatus including drive means for feeding a log to a processing station in a direction substantially parallel with the longitudinal axis of the log, a device for imparting rotational motion to a log about its longitudinal axis independently of the feeding motion of the log, comprising:

at least one pair of cylindrical rotators supported on opposite sides of said log for selective engagement with said log, said rotators having a longitudinal axis and external surfaces having helical upstanding portions, the longitudinal axes of said rotators being disposed obliquely to said longitudinal axis so that said upstanding portions of said rotator external surfaces are substantially parallel to the log longitudinal axis, and drive means, independent of said conveyor apparatus drive means, for driving said rotators in rotation about their longitudinal axes, whereby rotation of said log about its longitudinal axis is effected.

* * * * *

UNITED STATES PATENT AND TRADEMARK OFFICE
CERTIFICATE OF CORRECTION

PATENT NO. : 4,621,971

DATED : November 11, 1986

INVENTOR(S) : Kauko RAUTIO

It is certified that error appears in the above-identified patent and that said Letters Patent is hereby corrected as shown below:

Correct the spelling of the last name of the inventor in the heading and under item [76] to read: RAUTIO

Signed and Sealed this

Third Day of February, 1987

*Attest:*

DONALD J. QUIGG

*Attesting Officer*

*Commissioner of Patents and Trademarks*